UNITED STATES PATENT OFFICE.

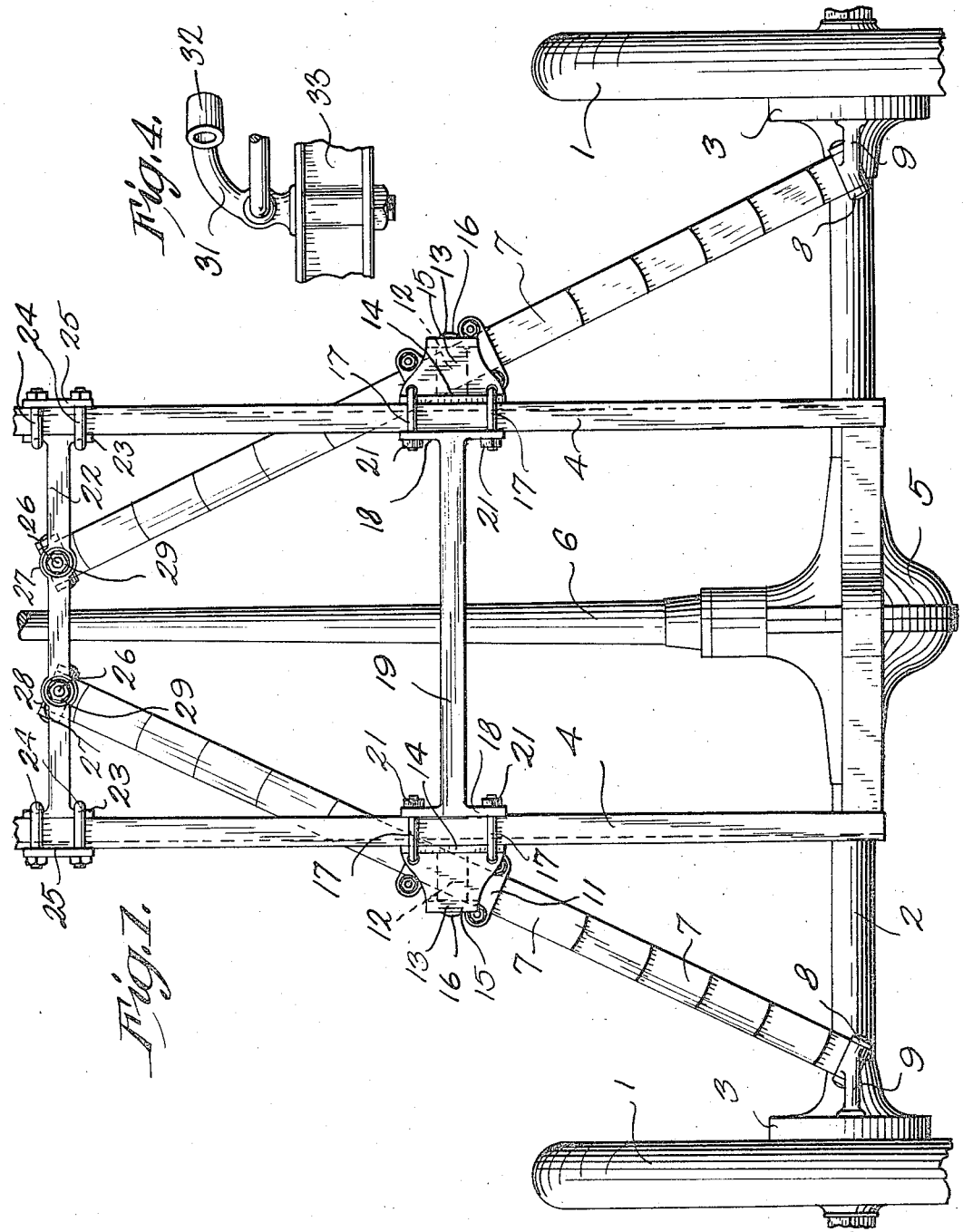

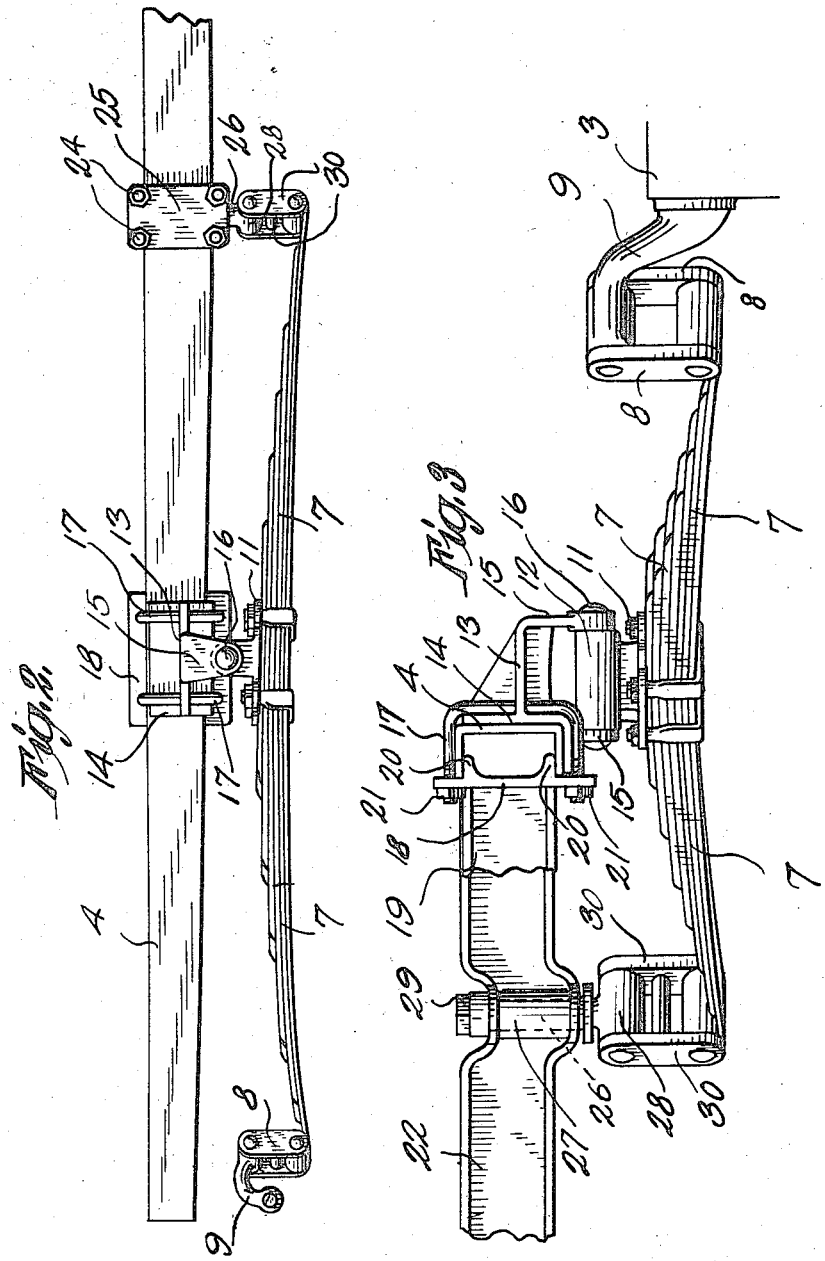

LOUIS RUTHENBURG, OF DAYTON, OHIO.

SPRING SUSPENSION FOR VEHICLES.

1,285,400.

Specification of Letters Patent.   Patented Nov. 19, 1918.

Application filed September 6, 1917.   Serial No. 189,919.

*To all whom it may concern:*

Be it known that I, LOUIS RUTHENBURG, citizen of the United States, residing at Dayton, in the county of Montgomery and State of Ohio, have invented certain new and useful Improvements in Spring Suspensions for Vehicles, of which the following is a specification.

My invention relates to motor vehicles and particularly to a system of spring suspension especially designed for application to existing machines in substitution for the spring construction therein found, without material change in the chassis or running gear construction of such vehicles.

The object of the invention is to improve the structure, as well as the means and mode of operation of the spring suspension features of such vehicles whereby they will not only be more efficient in use but will afford more easy riding qualities, be durable in use, responsive in action, easily and quickly applied to existing vehicles, economical in manufacture, and unlikely to get out of repair.

A further object of the invention is to provide improved connections and attachment means for a spring construction whereby substitute springs may be applied to the chassis of existing vehicles, without the necessity of special machine operations and without drilling or otherwise mutilating the chassis parts, and which is capable of application by persons unskilled in vehicle construction.

With the above primary and other incidental objects in view as will more fully appear in the specification, the invention consists of the features of construction, the parts and combinations thereof, and the mode of operation, or their equivalents, as hereinafter described and set forth in the claims.

Referring to the drawings, Figure 1 is a top plan view of the rear portion of a motor vehicle chassis to which the invention forming the subject matter hereof has been applied. Fig. 2 is a side elevation of a portion of the chassis to which one of the springs and its supporting connections has been applied. Fig. 3 is a rear view of one of the springs and its supporting connections. Fig. 4 is a detail view of a shackle bracket or support for a forward spring construction.

Like parts are indicated by similar characters of reference throughout the several views.

In Fig. 1 of the drawing, the construction forming the subject matter hereof has been shown as applied to the chassis of a Ford automobile. As constructed by the manufacturer, the vehicle body is supported upon the crown of a single bow or arch spring extending transversely across the vehicle chassis in a plane common with the axle. The ends of this single transverse bow spring are connected by shackle links to a spring hanger or bracket projecting from the brake housing at the rear of the machine or projecting upward from the front axle at the forward end of the machine. Such a construction permits the use of a spring of only comparatively short length whereby the full degree of resiliency of the spring is not available and the mode of supporting the vehicle bed thereon renders it especially susceptible to a rolling tendency.

Referring to the drawings, 1—1 are the rear wheels of the vehicle of which 2 is the rear axle and 3—3 are the brake housings located adjacent to the inner sides of the rear wheels. Extending fore and aft in parallel relation are the chassis frame bars 4—4. Intermediate the rear end of the chassis frame 4—4 is the usual differential gear housing 5 from which extends the drive shaft tube 6. The parts mentioned are component elements of a motor vehicle chassis as arranged in the Ford construction and form no part *per se* of the present invention.

In applying the present invention to such a construction there are employed two diagonally disposed cantaliver springs 7 supported at their rear ends by shackle links 8 suspended from spring hangers or brackets 9. The shackle brackets or hangers 9 are of the same general type as those now found in the Ford automobile construction, except that the hanger or bracket head is arranged at an inclination or angular in relation to the line of the rear axle, whereas in the original construction such hanger or bracket head is disposed in transverse relation to the axis of the axle. In applying the construction, the original shackle hangers or brackets are removed by disengaging them from the brake housings 3 and substituting therefor the shackle bracket or hanger 9 having the angularly disposed head the inclination of which agrees with that of the spring 7. The extremity of the spring 7 is connected to said hanger by the usual swinging shackle link. Connected to the medial portion of the spring 7 by suitable clevises 10 is one member of a pivotal or hinged fulcrum bracket. This member comprises a base portion 11 from which projects an integral trunnion sleeve or head 12. As indicated by dotted lines in Fig. 1, the axis of the integral trunnion sleeve or head 12 is angularly disposed or inclined in relation with the general direction or trend of the spring 7 and at right angles or perpendicular to the chassis frame bar 4. Supported upon the chassis frame bar 4 is a fulcrum hanger or bracket 13 having an angle base 14 adapted to engage the outer and under faces of the chassis frame bar 4 and having pendant lugs or ears 15 between which the head or trunnion sleeve 12 is pivoted upon a trunnion rod or pin 16 extending through said pendant lugs or ears 15 and said sleeve 12. This fulcrum bracket is preferably, though not necessarily, attached to the chassis frame bar 4 by means of clevises 17 which span the base portion 14 of said fulcrum hanger bracket and the chassis frame bar 4. The clevises 17 engage the T-shaped head 18 of a supplemental frame bar 19 interposed between the chassis frame bars 4—4 coincident with the positions of the fulcrum bracket 13. As at present constructed, the chassis frame bars 4—4 are in the form of channel beams the recessed sides of which are turned inward or adjacent one to the other. The supplemental transverse frame bar 19 may be provided with lugs 20 projecting beyond the T-shaped head 18 and within the channels of the said chassis frame bars 4—4. The T-shaped heads of the frame bar 19 not only extend a distance substantially equal to the width of the fulcrum hanger bracket 13 but also project above and below the frame bar 4 and are perforated to receive the ends of the clevises 17. Thus by tightening the nuts 21 of said clevises the transverse auxiliary frame bar 19 and the fulcrum bracket 13 are simultaneously clamped in position upon said chassis frame bar 4. At their forward ends the springs 7 are suspended beneath a second transverse auxiliary frame bar 22 interposed between the chassis frame bars 4—4. This auxiliary frame bar 22, like the frame bar 19 is provided with T-shaped extremities engaging the inner faces of the frame bars 4 to which it is clamped by means of clevises 24 which straddle the T-shaped heads 23 of said auxiliary bar 22 and the frame bars 4—4 and engage a clamp plate 25 positioned on the outer faces of said frame bars. It will be obvious that if so desired, the T-shaped heads 23 of the auxiliary frame bar 22 may be projected above and below the frame bars 4 and be perforated to receive the clevises 24 in the same manner that auxiliary frame bar 19 has been shown and described as being attached. The auxiliary transverse frame bars 19 and 22 serve to securely brace the chassis frame to render it rigid and prevent deflection of the side bars 4—4.

Mounted upon the transverse auxiliary frame bar 22 in positions to support the inner ends of the springs 7 are spring hangers comprising a stem or shank 26 extending through a suitable boss or bearing 27 in the transverse frame bar 22 and having at its lower end an integral transverse trunnion head or sleeve 28. This spring hanger is preferably revolubly adjustable in its bearings in the transverse frame bar 22 to facilitate its alinement with the springs 7 in the assembling of the supporting construction. It is secured to the frame bar 22 by means of a suitable nut 29 on the upper end of the stem 26. The inner end of the spring 7 is connected with this hanger by means of a swinging shackle link 30 similar to the shackle link 8 at the rear end of said spring. This shackle link 30 is pivoted in the transverse head or sleeve 28 of the hanger and also in the end of the spring 7 in order that it may yield to compensate for varying deflection of the spring. It will be understood that the shackle link 8 at the rear end of the spring is likewise pivoted in its supporting bracket or hanger 9 and in the end of the spring 7 in order that it may likewise yield.

While it will be possible for persons skilled in the art to devise other modes of attaching the cantaliver supporting springs 7 which will be within the scope of the appended claims, the particular construction and mode of attachment hereinbefore described will be found economical and convenient and capable of being readily and quickly applied by unskilled labor, without the necessity of mutilating or in any way modifying the present chassis frame construction.

While only the rear portion of the vehicle chassis has been shown in Fig. 1, it will be understood that the same construction of cantaliver spring suspension may be applied to the forward end of the chassis frame if so desired. In making the application of the spring suspension construction before described to the forward end of the vehicle, shackle brackets or hangers will be found in the original construction mounted in the front axle of the vehicle with their supporting heads arranged transverse to the axis of the front axle and supporting the opposite ends of a bow spring. In applying the cantaliver spring construction forming the subject matter hereof, such shackle hangers or brackets will be removed and a hanger or bracket such as is shown in Fig. 4 will be substituted therefor. The hanger or bracket 31 of Fig. 4 agrees with the original hanger or bracket except that the head 32 thereof is arranged at an inclination to the axis of the front axle 33 to agree with the inclination of the cantaliver spring to be supported thereon. Otherwise, the spring construction for the forward end of the vehicle will be substantially the same as that shown in Fig. 1 and hereinbefore described and the description of the rear unit or embodiment will suffice for both.

From the above description it will be apparent that there is thus provided a device of the character described, possessing the particular features of advantage before enumerated as desirable but which obviously is susceptible of modification in its form, proportion, detail construction or arrangement of parts, without departing from the principle involved or sacrificing any of its advantages.

While in order to comply with the statutes, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim:

1. In a spring construction for vehicles, the combination with a vehicle chassis, of a pair of divergent springs, a shackle hanger bracket for each spring mounted upon the axle of the vehicle and having a supporting head inclined to agree with the diagonal disposition of the spring, a shackle link connecting each hanger and corresponding spring, an auxiliary frame member arranged transversely in relation with the chassis frame, shackle hangers supported upon said frame member, links connecting the corresponding ends of the springs and said hangers, and intermediate supporting brackets comprising two pivotally connected members one of which is attached to the corresponding spring and the other connected to the side bar of the chassis, substantially as specified.

2. In a spring construction for vehicles, the combination with a vehicle chassis, of a pair of divergently disposed springs, shackle brackets for said springs mounted upon the brake housings of a vehicle, supporting heads upon said brackets inclined to the path of travel of the vehicle and agreeing with the degree of divergence of the springs, hinged fulcrum brackets for said springs mounted upon the chassis side bars and connected with the medial portions of the springs, and a transverse auxiliary chassis frame member from which the inner ends of the springs are suspended.

3. In a spring construction for vehicles, the combination with a vehicle chassis, of a pair of springs, shackle brackets for said springs mounted upon the axle of the vehicle, additional shackle brackets mounted on the chassis, said springs being suspended from said brackets, and an intermediate bracket for each spring comprising an angle base engaging the side and bottom faces of the chassis side bar, pendant spaced lugs or ears carried thereby, a second member comprising a base portion attached to the medial portion of the spring, and an integral head portion pivoted intermediate the pendant lugs or ears of the initial bracket member.

4. In a spring construction for vehicles, the combination with a vehicle chassis, of a pair of divergently arranged springs, pivotal fulcrum connections for said springs medially arranged in relation with the springs and supported upon the vehicle chassis, the axes of said fulcrum connections being inclined in relation with the general direction of the spring and at right angles to the path of travel of the vehicle, and supporting brackets upon the axle and the frame of the chassis to which the opposite ends of the spring are connected.

5. In a spring construction for vehicles, the combination with a vehicle axle and a vehicle body frame, of divergent spring arms having their medial portions pivotally connected to the body frame for oscillatory movement about axes at right angles to the path of travel of the vehicle, and supporting connections for the opposite ends of the springs upon the axle and body frame respectively, substantially as specified.

6. In a spring construction for vehicles, the combination with a vehicle axle and a vehicle body frame, of spring members supported medially upon said body frame, a shackle connection for one end of each spring carried by the axle, and a second shackle connection comprising a substantially T-shaped hanger the stem of which is revolubly mounted in the body frame, and a shackle link connecting the opposite end of each spring with the cross arm of the corresponding shackle hanger, substantially as specified.

In testimony whereof I have hereunto set my hand this 21st day of August A. D. 1917.

LOUIS RUTHENBURG.

Witnesses:
 FREDRICK W. HOWELL.
 MARVEL HOAGLAND.